US012766983B2

(12) United States Patent
Prasad et al.

(10) Patent No.: US 12,766,983 B2
(45) Date of Patent: Oct. 20, 2026

(54) HIGH POWER SHIELDED BUSBAR FOR ELECTRIC VEHICLE CHARGING AND POWER DISTRIBUTION

(71) Applicant: Tesla, Inc., Austin, TX (US)

(72) Inventors: Neil Prasad, Cupertino, CA (US); James Pang, San Jose, CA (US)

(73) Assignee: Tesla, Inc., Austin, TX (US)

( * ) Notice: Subject to any disclaimer, the term of this patent is extended or adjusted under 35 U.S.C. 154(b) by 902 days.

(21) Appl. No.: 17/912,018

(22) PCT Filed: Mar. 15, 2021

(86) PCT No.: PCT/US2021/022373
§ 371 (c)(1),
(2) Date: Sep. 15, 2022

(87) PCT Pub. No.: WO2021/188438
PCT Pub. Date: Sep. 23, 2021

(65) Prior Publication Data

US 2023/0136576 A1 May 4, 2023

Related U.S. Application Data

(60) Provisional application No. 62/990,395, filed on Mar. 16, 2020.

(51) Int. Cl.
*B60L 53/14* (2019.01)
*H02G 5/06* (2006.01)

(52) U.S. Cl.
CPC .............. *B60L 53/14* (2019.02); *H02G 5/061* (2013.01)

(58) Field of Classification Search
CPC ...................................................... H02G 5/061
USPC ......................................................... 174/68.1
See application file for complete search history.

(56) References Cited

U.S. PATENT DOCUMENTS 4,151,365 A 4/1979 Hacker
4,775,337 A 10/1988 Van Wagener et al.
9,954,320 B1 4/2018 Hassan et al.
2003/0201116 A1 10/2003 Carlson et al.
2013/0140055 A1 * 6/2013 Adachi ................ H01B 7/0045 174/113 R (Continued)

FOREIGN PATENT DOCUMENTS

CN 102369638 3/2012
CN 103390453 11/2013

(Continued)

OTHER PUBLICATIONS

International Search Report and Written Opinion dated Jun. 21, 2021 in application No. PCT/US2021/0222373.

(Continued)

*Primary Examiner* — Stanley Tso
(74) *Attorney, Agent, or Firm* — Knobbe, Martens, Olson & Bear, LLP

(57) ABSTRACT

A unitary busbar provides power from one connection point in an electric vehicle to another connection point. The unitary busbar includes a central solid core conductor, an insulation layer over the solid core conductor, and an electromagnetic shield fitted around the insulator. The unitary busbar is capable of being bent into specific configurations that allow it to conform to the body of an electric vehicle.

16 Claims, 9 Drawing Sheets

(56) References Cited

U.S. PATENT DOCUMENTS

| | | | | |
|---|---|---|---|---|
| 2013/0175079 | A1* | 7/2013 | Adachi | B60R 16/0215 174/350 |
| 2014/0259660 | A1 | 9/2014 | Poma et al. | |
| 2014/0345904 | A1* | 11/2014 | Nagahashi | H01B 7/04 174/107 |
| 2015/0057987 | A1* | 2/2015 | Suzuki | G06F 30/23 703/2 |
| 2018/0317334 | A1* | 11/2018 | Grotz | H01B 5/02 |
| 2019/0199075 | A1* | 6/2019 | Sugimura | H01B 9/006 |
| 2019/0259511 | A1* | 8/2019 | Ooi | H01B 7/04 |
| 2019/0356068 | A1* | 11/2019 | Simonsohn | H01B 17/26 |
| 2021/0249802 | A1* | 8/2021 | Yamamoto | H01R 13/688 |
| 2022/0029329 | A1* | 1/2022 | Kempf | F16L 25/01 |

FOREIGN PATENT DOCUMENTS

| | | | |
|---|---|---|---|
| CN | 108281225 | 7/2018 | |
| EP | 2 253 963 | 11/2010 | |
| EP | 2253963 A1 * | 11/2010 | G01R 15/14 |
| EP | 2 610 878 | 7/2013 | |
| JP | 2004-095530 | 3/2004 | |
| JP | 2010-247642 | 11/2010 | |
| JP | 2012-048823 | 3/2012 | |
| JP | 2014-229415 | 12/2014 | |
| JP | 2015-201284 | 11/2015 | |
| JP | 2018-165105 | 10/2018 | |
| JP | 2019-115253 | 7/2019 | |
| TW | M400075 | 3/2011 | |
| WO | WO 14/070851 | 5/2014 | |
| WO | WO 17/072073 | 5/2017 | |

OTHER PUBLICATIONS

EBay—2020-2023 Tesla Model 3 HV Busbar Charge Port Chargeport Plug 2433 B26 I eBay (available at https://www.ebay.ca/itm/1664%2078614440?skw=1501773-1%200-D&itmmeta0IJJS4MHONTZWPCZBRZH5EYE05&hashitem26c2e60fa 8:g:IQMAAO%E2%80%A6 (hereinafter, the "eBay Listing") (last accessed on May 15, 2025). 6 pages.

Ebay, Tesla Model Y High Voltage Busbar Cable Wire Harness 1501773-10-D Eom, ebay, https://www.eabay.com/itm/186067845085, accessed May 20, 2024, 8 pp.

Lambert, Mar. 13, 2-2-, First look at Tesla Model Y's owner's manual, Electrek, https://electrek.co/2020/03/13/tesla-model-y-owners-manual/, 5 pp.

Munro Live, Apr. 6, 2020, Model Y E12: Floorplan, EPP Floor Risers, Commonality through Stanchions, and Wiring Observations, screenshot of youtube video, https://www.youtube.com/watch?v=B2xyJTO9CUs, 1 p.

Tesla Model Y Owner's Manual, North America, Mar. 13, 2020, 226 pp.

Tesla, Model Y Parts Catalog: 44 High voltage system, 4450-HV Harnesses, Part 8 High Voltage Busbar Connector PLUG 600V, 1507801-00-D (available at https://epc.tesla.com/en- US/catalogs) (hereinafter, the "Model Y Parts Catalog") (last accessed on May 15, 2025). 1 page.†

Tesla, Model 3 Parts Catalog: 44 High voltage system, 4450-HV Harnesses, Part 8 High Voltage Busbar Connector PLUG 600V, 1507801-00-D (available at https://epc.tesla.com/en- US/catalogs) (hereinafter, the "Model 3 Parts Catalog") (last accessed on May 15, 2025). 2 pages.†

Tesla Service Manual, Model Y, Connector-DC Input-Busbar- Charge Port to HV Battery (Remove and Replace) (available at https://service.tesla.com/docs/ModelY/ServiceManual/en-us/GUID-36DDC014-AEC0-4139-AF9F-720F5848FC3C.html) (hereinafter, the "Model Y Service Manual Part 1") (last accessed on May 15, 2025).†

Tesla Service Manual, Model Y, Connector-DC Input-Busbar- Charge Port to HV Battery (Remove and Replace) (available at https://service.tesla.com/docs/ModelY/ServiceManual/en-us/GUID-0CA41569-F75D-4F5D-A1DD-811333FB288B.html) (hereinafter, the "Model Y Service Manual Part 2") (last accessed on May 15, 2025). 28 pages.†

EV Repair Garage, Tesla 3 and Y, Part 1507801-00-C (available at https://www.evrepair.pl/en/system-hv/225-wtyk-wysokiego-napiecia- tesla-3-i-y-150780100c.html) (hereinafter, the "EV Repair Garage") (last accessed on May 15, 2025).† eBay—2020-2023 Tesla Model 3 HV Busbar Charge Port Chargeport Plug 2433 B26 I eBay (available at https://www.ebay.ca/itm/1664%2078614440?skw=1501773-1%200- D&itmmeta0IJJS4MH0NTZWPCZBRZH5EYE05&hashitem26c2e60fa 8:g:iQMAAO%E2%80%A6 (hereinafter, the "eBay Listing") (last accessed on May 15, 2025). 6 pages.†

Tesla Service Manual, Model 3 2024+, Connector-Battery Side-Charge Port to HV Battery Bus bar (Remove and Replace) (available at https://service.tesla.com/docs/Model3/ServiceManual/2024/en- us/GUID-E56804F8-BD64-4006-92F0-8C351810061A.html) (hereinafter, the "Model 3 Service Manual") (last accessed on May 15, 2025). 5 pages.†

Munro Live, Model Y E12: Floorpan, EPP Floor Risers, Commonality through Stanchions, and Wiring Observations, YouTube (Apr. 6, 2020), available at https://www.youtube.com/watch?v=B2xyJTO9CUs&t151s (hereinafter, "Munro").†

2020-2023 Tesla Model Y High Voltage Busbar Cable Wire Harness 1601773-10-D OEM, eBay, available at https://www.ebay.com/itrn/186067845084?mkcid=16&mkevt1&mkrid711-127632-2357-0&ssspoC4RBvd2JR_u&sssrc2047675&ssuid&widgetver=artemis&mediaCOPY (hereinafter, "eBay").†

Tesla, Model Y Owner's Manual, (Mar. 13, 2020) (hereinafter, the "2020 Model Y Owner's Manual"). As evidence of publication of the 2020 Model Y Owner's Manual, Fred Lambert, First look at Tesla Model Y's owners manual, ELECTREK (Mar. 13, 2020), available at https://electrek.co/2020/03/13/tesla-model-y-owners-manual/. Also as evidence of publication of the 2020 Model Y Owner's Manual, Jameson Dow, Tesla Model Y has a heat pump for consistent range in cold climates, ELECTREK (Mar. 13, 2020), available at https://electrek.co/2020/03/13/tesla-model-y-has-a-heat-pump-forconsistent- range-in-cold-climates/.†

* cited by examiner
† cited by third party

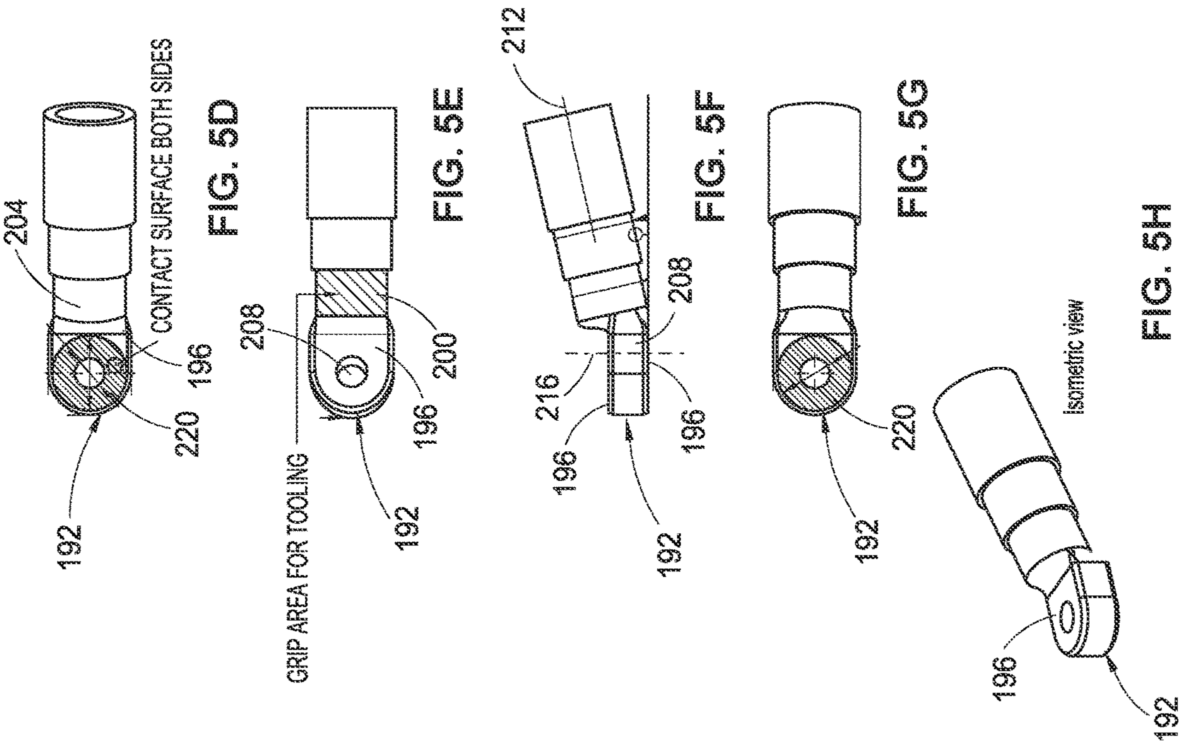
FIG. 5D
FIG. 5E
FIG. 5F
FIG. 5G
FIG. 5H
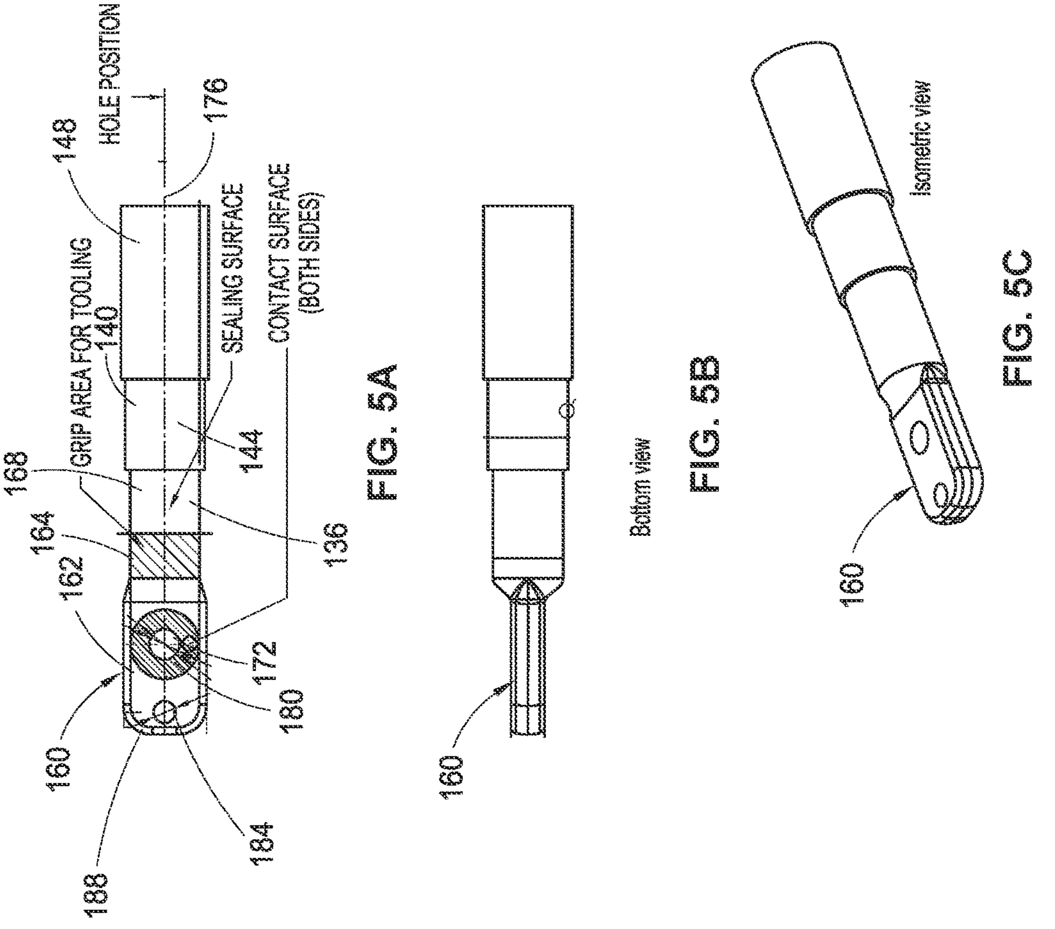
FIG. 5A
FIG. 5B
FIG. 5C

HIGH POWER SHIELDED BUSBAR FOR ELECTRIC VEHICLE CHARGING AND POWER DISTRIBUTION

TECHNICAL HELD

The disclosed subject matter generally relates to systems and methods for high power shielded bulbar for electric vehicle charging and power distribution.

BACKGROUND

Traditional car wiring for vehicles includes a plurality of cables for communicating power signals or data signals from one end to another. Traditional cable designs are unable to support the increased demand for high-power distribution inside the vehicle. Further, there is a constant need for improving the designs of the cables to handle high power in excess of several hundred kilowatts. Traditional cables do not provide sturdy rigid high power shielded support for electric vehicle charging and power distribution. Moreover, as the number of electronic modules increases, the complexity and cost associated with traditional cables becomes excessive. In addition, failures in wires or conductors of large cable assemblies can be difficult to isolate and costly to repair.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 1-9 illustrate various embodiments of a high power shielded busbar for use within electric vehicles for charging and power distribution.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

Figure 1:
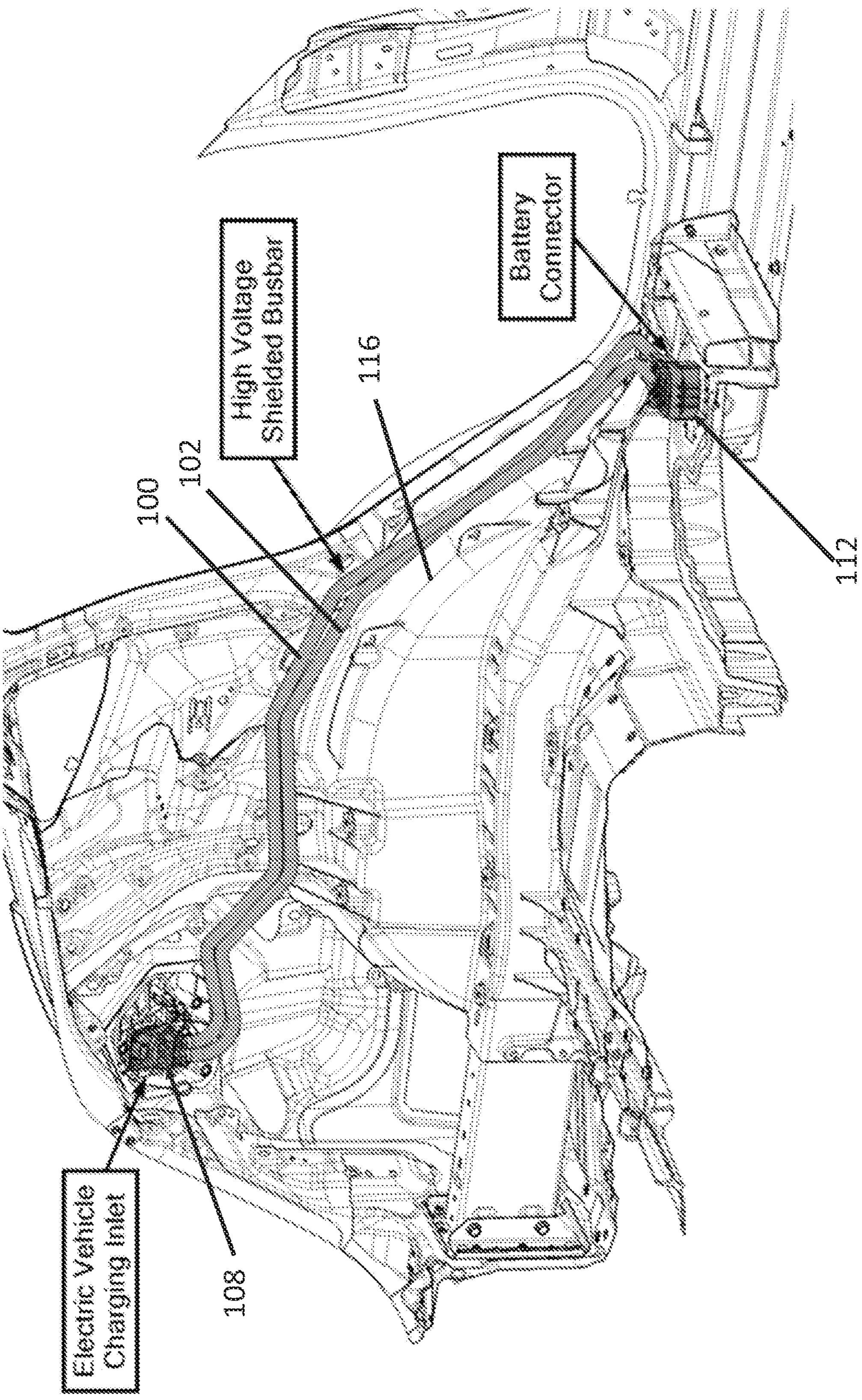
Figure 2:
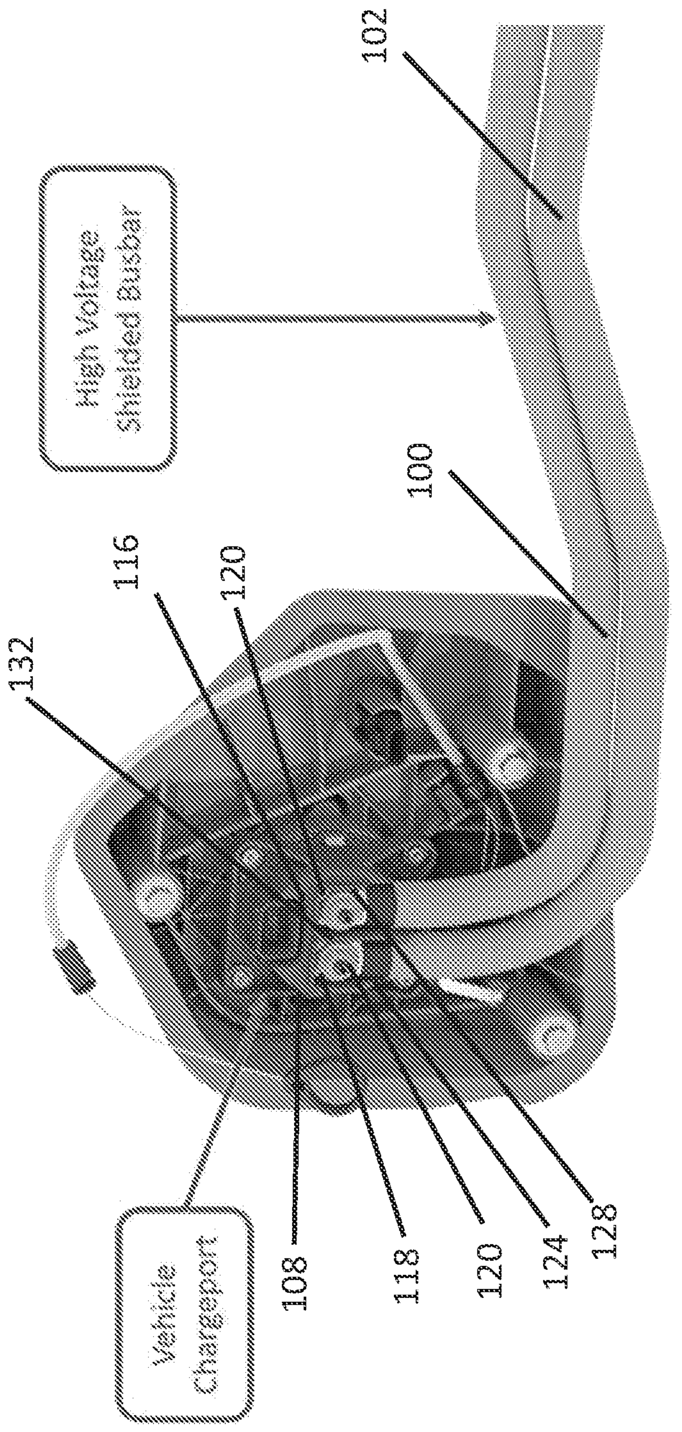

FIG. 1 is a cutaway view depicting an embodiment of a high power shielded busbar installed to a vehicle FIG. 2 is a close-up view of an embodiment of a high power shielded busbar connected to a vehicle chargeport.

Figure 3A:
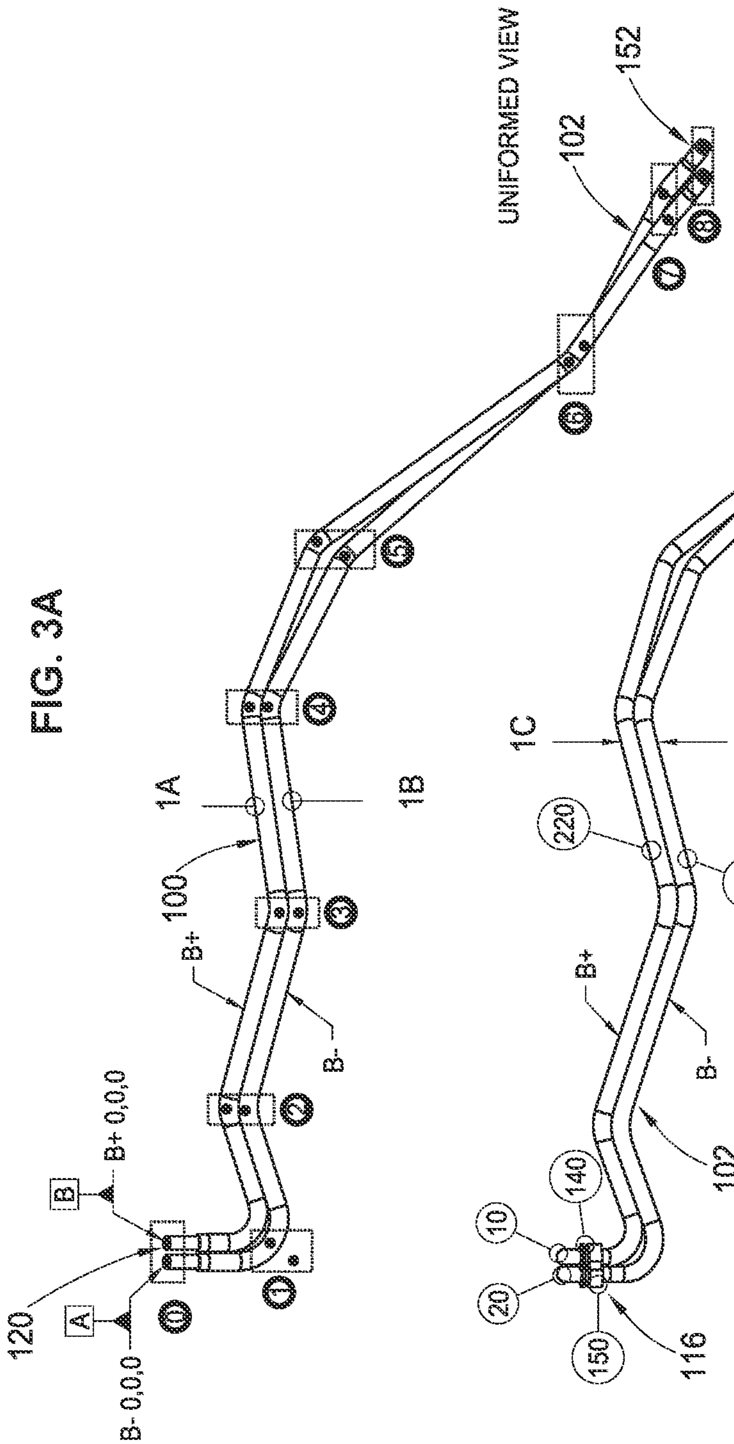

FIG. 3*a* is perspective view of an embodiment of a high power shielded busbar.

Figure 3B:
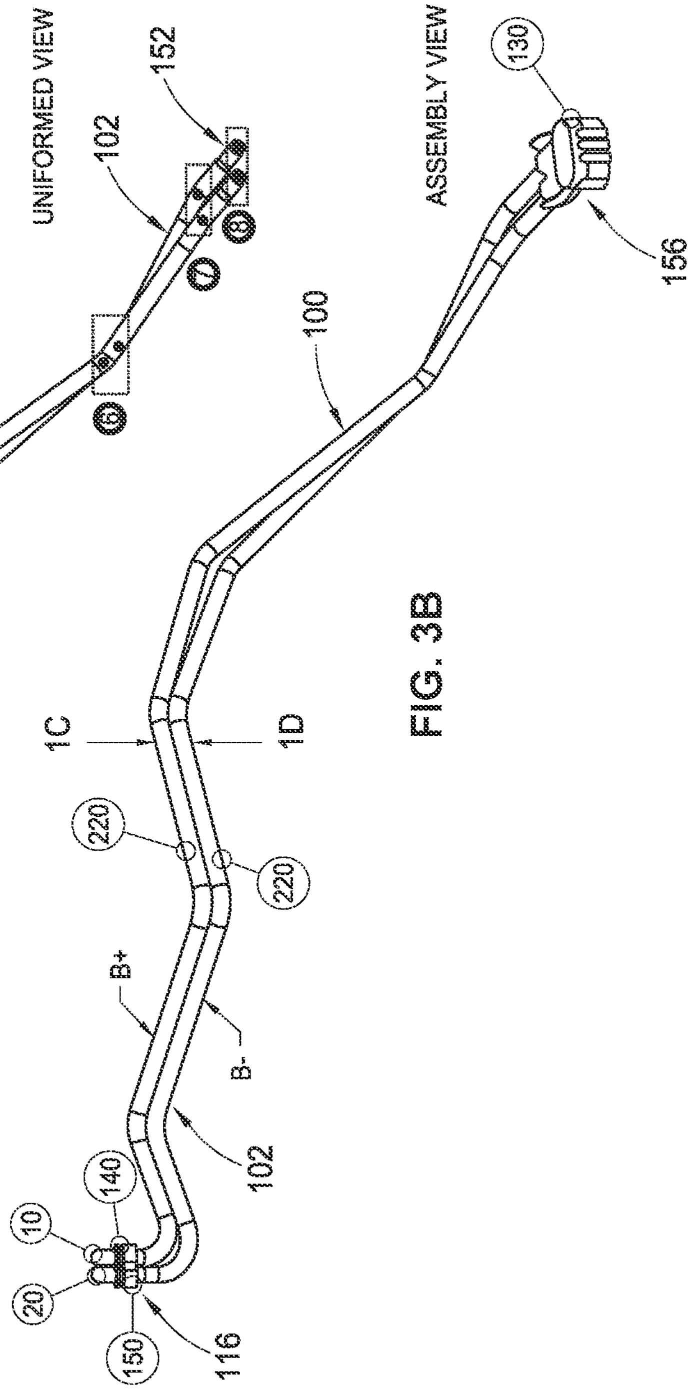

FIG. 3*b* is perspective view of an embodiment of a high power shielded busbar with attached receptacles.

Figure 4:
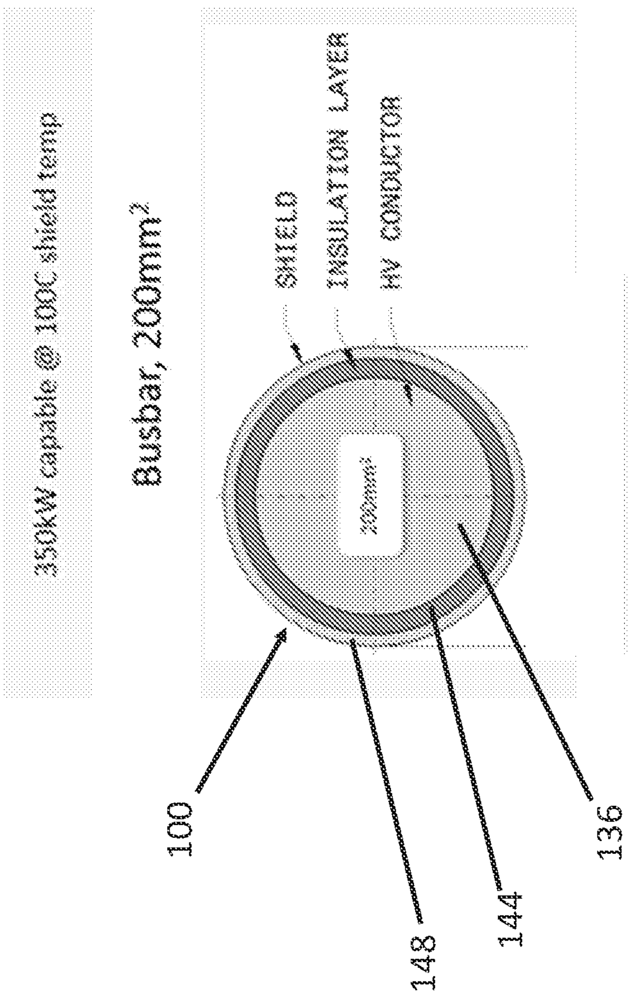

FIG. 4 is a cross-sectional view of an embodiment of a high power shielded busbar.

FIG. 5A-5H are various views of busbar end connectors.

Figure 6C:
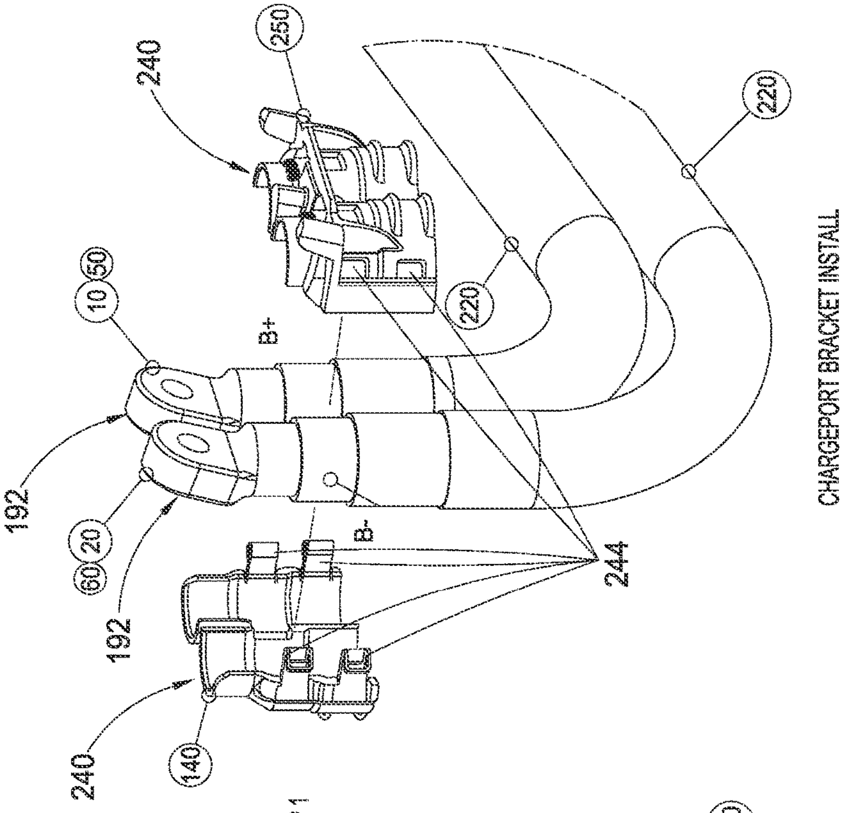
Figure 6A:
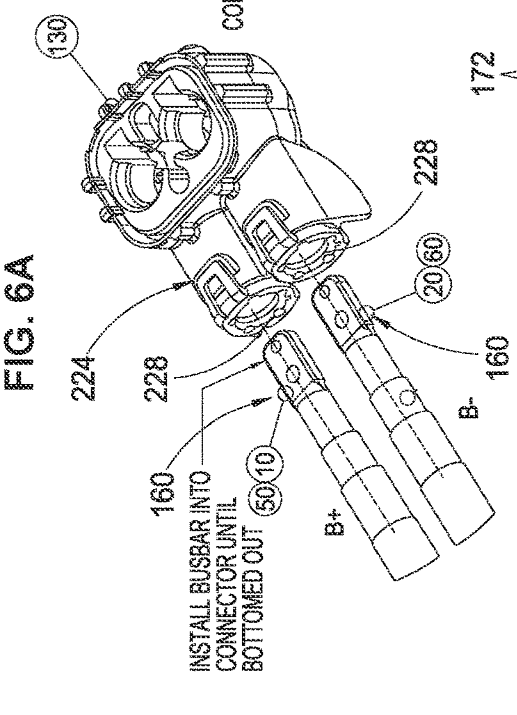
Figure 6B:
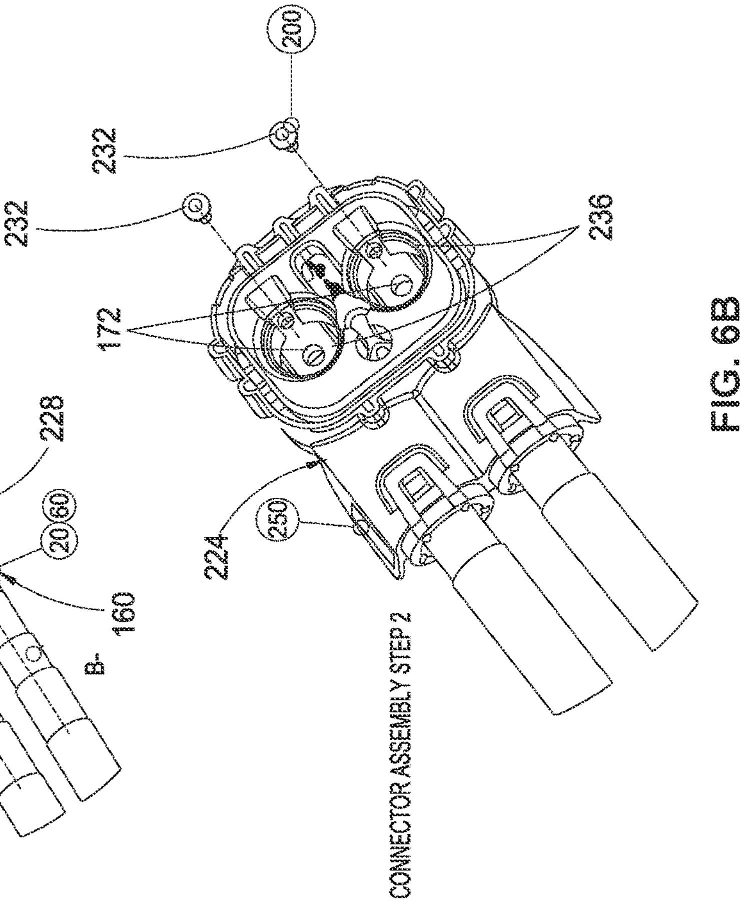

FIG. 6A-6C are various views of busbar end connectors and associated receptacles.

FIG. 7A-7D are various views of busbar end connectors and associated receptacles.

Figure 8:
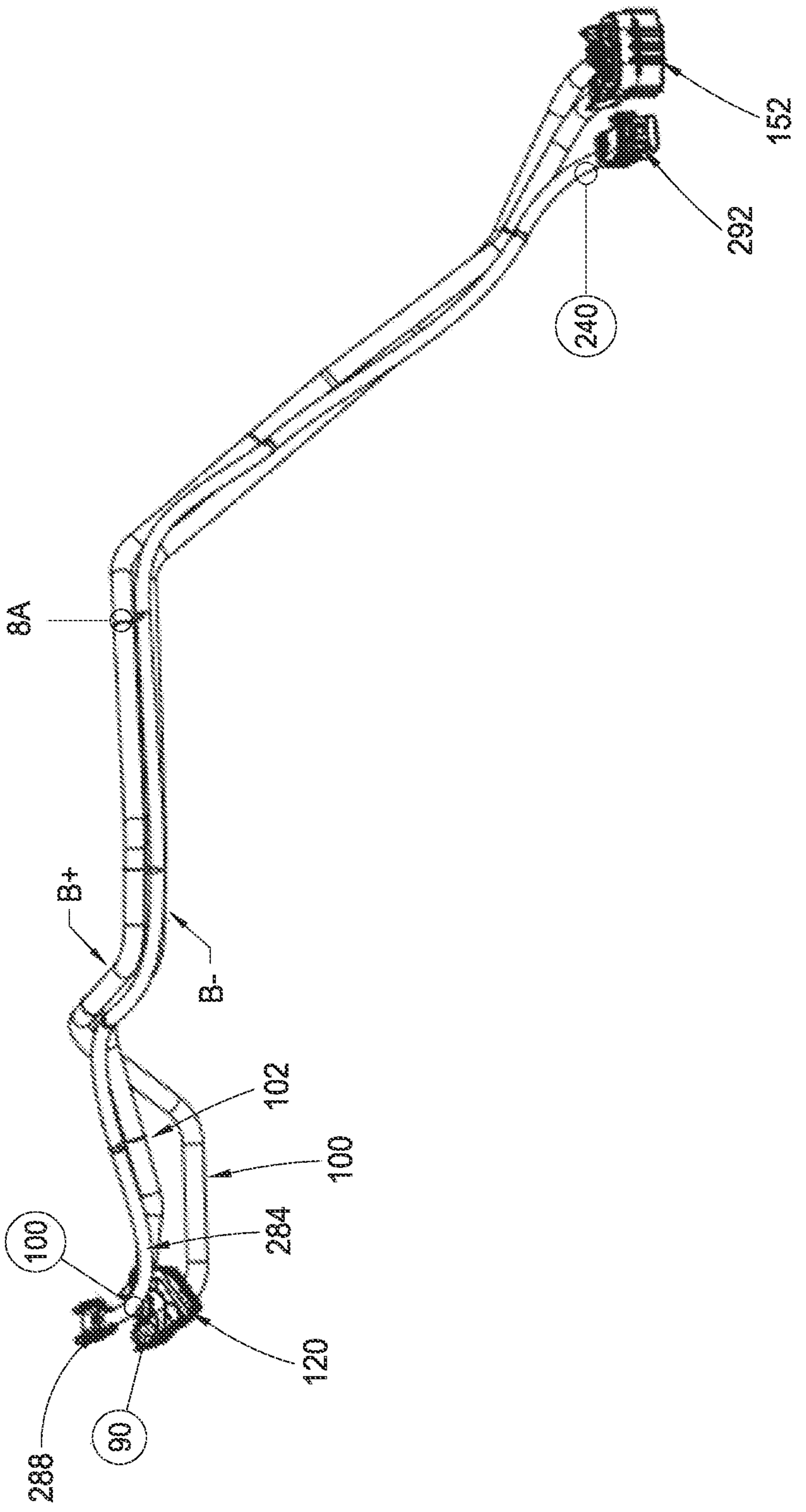

FIG. 8 is a busbar with associated receptacles and a grounding element.

Figure 9:
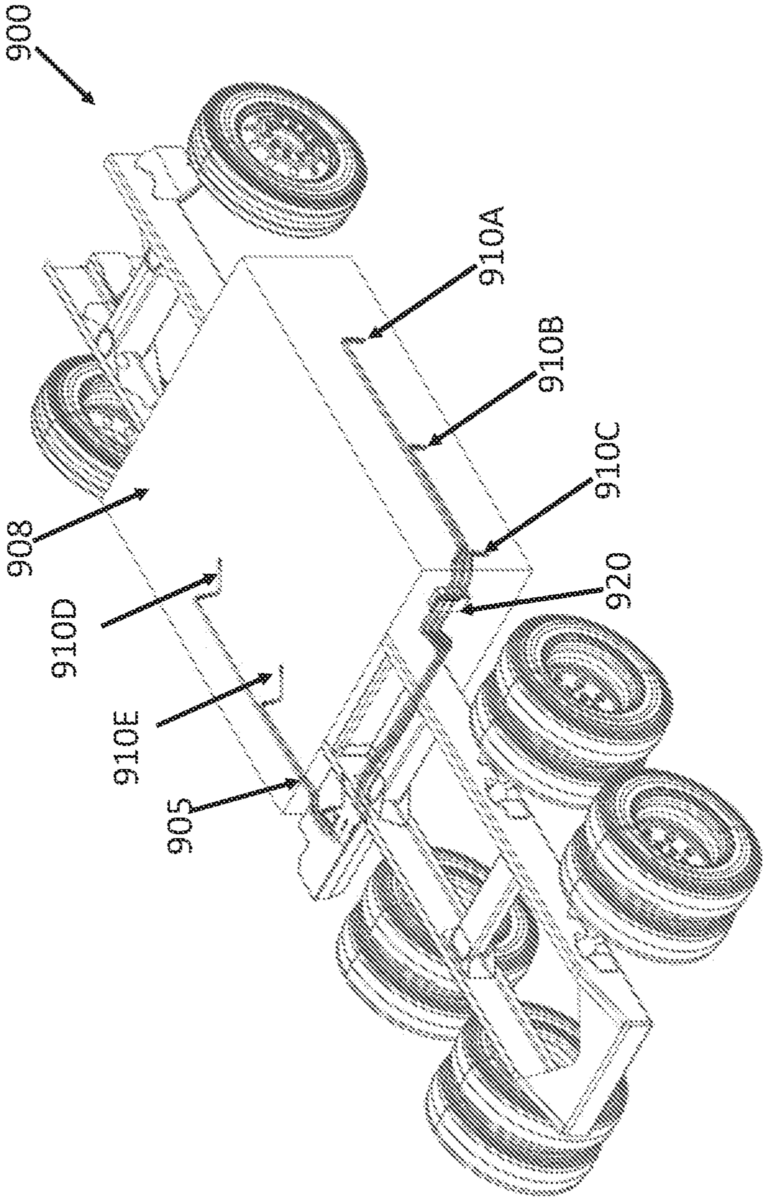

FIG. 9 is perspective view of an alternate embodiment showing a set of high power shielded busbars within a semi-truck.

DETAILED DESCRIPTION

In the following, numerous specific details are set forth to provide a thorough description of various embodiments, Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Embodiments relate to a solid core conductor busbar for transferring power from a first connection point to a second connection point. In some embodiments, the busbar transfers power from one point to another in an electric vehicle, for example from a charge port to a battery pack. In some embodiments, the busbar conductor may be made of any conductive material, such as aluminum or copper. In some embodiments, the busbar conductor is made by forging metal so that the busbar takes on a desired shape and format. For example, a cylindrical aluminum rod may be made by forging, wherein the end portions of the aluminum rod are forged to create the desired end connection points from the same metal as the solid core conductor material with no joints between the solid core conductor and the connection point. In one example, the end of an aluminum rod is forged to create a conductor with a flatted end. A through hole may be formed in the flattened end to receive a screw or bolt that allows a direct electrical connection between the sold conductor and the connection point. By not having joints or intermediate connections between the connection point and the solid core conductor, the busbar may have more reliability than other systems which include such joints or intermediate connections. It should be realized that the forged ends of the solid core conductor are not limited to being flattened ends. They may be forged into a variety of geometric shapes conducive to making a connection with a connection point without departing from the spirit of this disclosure. For example, the forged ends may be made cylindrical, square, rectangular, hexagonal, notched, folded, angled or in any other configuration.

In some embodiments, the busbar includes a central solid conducting core, along with an electrical insulation layer that surrounds the central conducting core and provides electrical insulation of the conductor so it will be electrically isolated from external contacts. In one embodiment, the insulation layer may be placed onto the solid core by extruding, heat-shrinking, dipping, spraying, layering, brushing, or otherwise applying the insulation layer onto the conducting core by well-known means.

In some embodiments, an outer shield or shielding layer is then fitted over the insulated conducting core to provide additional safety, strength and electromagnetic insulation of the busbar from other neighboring components once installed into its target position within an electric vehicle or other system. The outer shield or shielding layer may be made of any conductive material, such as aluminum. In some embodiments, the outer shield or shielding layer may act as a conductive layer and be grounded, for example to a vehicle body, to complement an isolation loss detection system between high voltage potentials.

In one embodiment, the insulated central conductor may be placed within a shield tube which has a diameter which allows it to slide over the insulated core. That shielded busbar may then be placed into a compression die to reduce the diameter of the shield tube so that it fits directly and snugly against the outer insulation layer of the busbar. This forms a unitary three-layer solid core busbar with a central solid core conductor, an insulation layer, and an outer shield compressed onto the insulation layer. By creating this type of unitary solid busbar configuration, the unitary busbar may be bent into a desired configuration to match the contours of the target application. For example, the unitary busbar may be bent to match the contours of a wheel well or interior side panel within an electric vehicle. The resultant layered assembly may withstand 3D form bending so that the solid busbar may match the contours of a vehicle and form complex packaging geometries. The solid nature of the unitary busbar allows for such bending as each layer is formed over the lower layer so that they mechanically support each other through the bending process. This also allows the unitary busbar to maintain a relatively low cross-sectional area while having the capability to transfer a relatively large amount of power from one point to another within a system.

In some embodiments, the central core of the busbar may be made from one or more conductors within the rigid busbar and have a circular cross section. In some embodiments, the one or more conductors have a rectangular cross section. In some embodiments, other cross-sectional geometries of the one or more conductors are used. In some embodiments, more than one busbar is run in parallel with another busbar to transfer relatively high power loads from a first connection point to a second connection point. For example, in an application where one megawatt of power is needed to be transferred from a first connection point to a second connection point, a set of 2, 3, 4, 5, 6, or more individual busbars may be used to distribute the load from the first connection point to the second connection point. This may allow the busbars to take differing routes from the first connection point to the second connection point, for example, if the size of and geometric configuration of the vehicle that needs to be traversed wouldn't allow for a single large diameter busbar to be run from the first connection point to the second connection point. This may also allow a single connection point to distribute power to multiple second connection points, for example wherein a single charge port of an electric vehicle transfers power to multiple different battery packs within the vehicle. In that situation, each busbar may be sized and shaped to carry the correct amount of power along a specific path within the vehicle to its target connection point.

In some embodiments, the high-power busbar configuration allows for over two times the conductor cross section for the same packaging volume. This increase in cross section allows for two times or more of the thermal performance enabling higher power capacity and allowing for increased vehicle interior volume due to reduced thermal clearance requirements to surrounding parts.

Through manufacturing methods utilizing CNC bending, complex routing may be achieved to package the busbar with bends in multiple axis and at lengths exceeding two meters. The rigidity of the busbar offers a self-supporting assembly which allows for the removal of traditional routing components necessary for traditional cable assemblies such as clips and brackets, reducing cost and complexity. This process may allow for time savings in both manufacturing and installation. Through simplification of the manufacturing method by removing non-value add processes, a lower cost may be achieved compared to a traditional cable assembly. In addition, size/mass may be reduced, and charged rate and thermal performance may be increased.

The high power shielded busbar may be used extensively around an electric vehicle and may be suited to static networks external to the high voltage battery pack. The application of the high power shielded busbar is suited to high voltage, high current applications, but is not limited to the combination of the two.

The high power shielded busbar provides excellent thermal performance (for example, two times the performance of equivalent sized cables), mass reduction to the vehicle and/or high power line assembly, cost reduction (e.g., not as many pieces, overhead, cheaper to manufacture etc.), and complexity reduction (e.g., the number of parts, processes, and/or supply chain complexity is reduced).

The high power shielded busbar makes DC fast charging currents possible that previously would have incurred prohibitive cost and mass penalties. The high power shielded busbar may support 350 kW charging at 400V or additional power and voltages. The high power shielded busbar may distribute such power levels around a vehicle external to any shielded enclosure.

FIG. 1 depicts a cut-away view of the inside of an electric vehicle and illustrates a pair of high power shielded busbars 100, 102. In one embodiment, the busbar is formed from a rigid solid core extrusion (aluminum, copper or other electrically conductive material), an insulation layer (cross-linked polyethylene (XLPE), polyvinyl chloride (PVC), silicone or other electrically insulated material), and an outer conductive layer (copper, aluminum or other electrically conductive material) which acts as a shield for electromagnetic interference and protection from damage. As illustrated, the busbars 100, 102 provide an electrical connection between an electrical vehicle charging inlet 108 and a battery connector 112. As can be appreciated, the wattage used to charge such electric vehicles can be very high. For example, in some embodiments a charging wattage of 100 kW, 200 kW, 300 kW, 400 kW or more may be used to charge electric vehicles. Thus, in one embodiment, the high power shielded busbars 100, 102 are sized to provide safe and stable transfer of such high power from the charging provide sufficient power from the charging inlet to the electric vehicle battery. It should also be realized that the high voltage shielded busbars 100, 102 may be bent and shaped to follow the interior configuration of the electric vehicle as illustrated in FIG. 1. For example, the busbars may be shaped to follow the interior configuration of a wheel well 116 within the electric vehicle. Thus, the busbars may be hidden from the vehicle occupants by traversing underneath floor or side panels of the electric vehicle.

As shown is FIG. 2, the busbars 100, 102 can be connected at a first end to the charging inlet 108. In some embodiments, the busbars 100, 102 are sufficiently rigid to be supported at only the two ends bearing the weight of the entire busbar 100, 102. Referring to the charging inlet 108, a receiver 116 can mechanically and electrically couple the busbars 100, 102 to the charging inlet 108. The receiver 116 can be fastened to the busbar 100, 102 via fasteners 118. For example, the busbars 100, 102 can have a connection portion 120 with a through hole (not shown).

The receiver 116 can be formed from a plastic molded portion that includes a pair of receptacles 124,128 for each connecting busbar 100, 102. The receptacle 124 can be separated from the receptacle 128 by a dividing wall 132. The receiver 116 can form an electrical coupling between a charging inlet 108 and the busbar 100, 102. In some embodiments the receiver 116 can be further coupled to a ground. The ground can have a structure similar, in at least some aspects, to the busbar 100, 102.

FIG. 3A shows the busbars 100, 102 in a bent configuration. The busbars 100, 102 can be suitable for bending. The busbars 100, 102 can be supplied unbent and be subsequently bent to a required configuration. As illustrated, the busbars may be bent to have specific angles or radii at positions 1, 2, 3, 4, 5, 6, 7, and 8. These bends as illustrated are just one example of the configuration that may be used to follow the interior configuration of a particular vehicle. It should be understood that other configurations of busbars are contemplated by this disclosure, with each configuration following the specific configuration of the vehicle. FIG. 100, 102 depict the busbars with connection portions 120, 152. The connection portion 152 may be similar to connection portion 120 is many aspects. In some embodiments, the connection portions 120, 152 can both have the same shape. In other embodiments, the connection portions 120, 152 may have different shapes. In some embodiments, the connection portions 120, 152 of the busbar 100 may be different shapes than the connection portions 120, 152 of the busbar 102.

FIG. 3B. shows the busbars 100, 102 with the connection portions 120 coupled to the receiver 116. In the depicted embodiment, the busbars 100, 102 are connected to a second receiver 156. The second receiver 156 may be similar in may aspects to the first receiver 116.

FIG. 4 depicts a cross-section of the busbar 100. In the depicted embodiment the busbar 100 has the solid core 136, the insulation layer 140 and the outer conductive layer 148. The core 136 can be made of aluminum, copper or other electrically conductive material. The core 136 can provide mechanical support or structure to the busbar 100, 102. The insulation layer 144 can be XLPE, PVC, silicone or other electrically insulated material. The insulation layer can be surrounded by an outer shield layer 148. The outer shield layer 148 can provide a shield for electromagnetic interference and protection from damage. The outer conductive layer 148 can be made of copper, aluminum or other electrically conductive or nonconductive material used to provide electromagnetic shielding for the busbar 100. The outer conductive layer 148 can provide mechanical support or structure to the busbar 100, 102. The core 136, insulated layer 144 and conductive layer 148 can be mechanically fastened to each other. For example, the core 136, insulation layer 144 and conductive layer 148 can be swaged together.

In some embodiments, the core 136 can have a cross-sectional surface area of about 200 $mm^2$. In some embodiments, the core 136 can have a cross-sectional area of between about 3 $mm^2$ and 300 $mm^2$. In some embodiments, the core 136 can have a cross-sectional area of between about 150 $mm^2$ and 250 $mm^2$, or about 160 $mm^2$ and 200 $mm^2$ or any number between these values. In some embodiments, the core can have a cross-sectional area that is greater than about 10, 20, 30, 40, 50, 60, 70, 80, 90, 100, 110, 120, 130, 140, 150, 160, 170, 180, 190, 200, 210, 220, 230, 240, 250, 260, 270, 280, 290, or 300 mm. In some embodiments, the insulation layer 144 can have a thickness of about 1 mm. In some embodiments, the insulation layer 144 can have a thickness between about 0.5 and about 2 mm. In some embodiments, the outer conductive layer 148 can have a thickness of about 1 mm. In some embodiments, outer conductive layer 148 can have a thickness between about 0.5 and about 2 mm.

The busbar 100,102 can be capable of transmitting 350 kW at 600V while maintaining less than about 100 degrees Celsius shield temperature. In some embodiments, the busbar 100,102 can be capable of transmitting about 250 kW-450 kW at about 400V-1000V while maintaining less than an about 80 Celsius to 120 Celsius shield temperature. In some embodiments, the busbar 100,102 can be capable of transmitting about 300 kW-400 kW at about 500V-700V while maintaining less than about 90 Celsius to about 110 Celsius of shield temperature.

FIGS. 5A-5H depict various types of connection portions 120, 152. Other shapes for the connection portions 120, 152 are also possible. The connection portion 120, 152 can be a cylindrical extension of the core 136. The connection portion 120 of the busbar 100, 102 can be a flattened portion of a solid core 136 of the busbar 100, 102. The solid core 136 of the busbar 100, 102 can be made of an electrically conducting and can be made of a rigid material. The connection portion 120 can be formed by the exposed solid core 136. In some embodiments the connection portion 120 can be a flattened and stripped portion of the busbar 100, 102. The connection portion 120 can include a flattened region and a cylindrical region. The solid core 136 can be made of aluminum, copper or other electrically conductive material. The core 136 can provide mechanical support or structure to the busbar 100, 102. A partially stripped portion 140 can be arranged proximate to the connection portion 120. The partially stripped portion 140 can have a cylindrical solid core 136, and an annular insulation layer 144, The insulation layer 144 can be XLPE, PVC, silicone or other electrically insulated material. The insulation layer can be surrounded by an outer conductive layer 148. The outer conductive layer 148 can provide a shield for electromagnetic interference and protection from damage. The outer conductive layer 148 can be made of copper, aluminum or other electrically conductive material. The outer conductive layer 148 can provide mechanical support or structure to the busbar 100, 102.

FIG. 5A-5C depict a flat type connection portion 160. The connection portion 160 can have a flattened portion 162, a grip area 164 for tooling, a cylindrical sealing surface 168, and a partially stripped portion 140. In the depicted embodiment the flattened portion 162 can have a primary hole 172. The primary hole 172 can be a through hole. The primary hole 172 can be disposed along a longitudinal axis 176. A contact surface 180 can be disposed circumferentially around the primary hole 172. The contact surface 180 can extend to both sides of the flattened portion 162. The flattened portion can include a secondary hole 184. The secondary hole 184 can be a through hole. The secondary hole 184 can be located along the longitudinal axis 176. The secondary hole 184 can be smaller in diameter than the primary hole 172. The secondary hole 184 can be positioned closer to the tip 188 of the connection portion 160. The grip portion 164 may extend only partially around the circumference of the connection portion 160.

FIG. 5D-5H depict an angled connection portion 192. The angled connection portion 192 can have a flattened portion 196, a grip area 200 for tooling, a cylindrical sealing surface 204, and a partially stripped portion 140. In the depicted embodiment the angled connection portion 192 can have a hole 208. The hole 208 can be a through hole. The hole 208 can be disposed along a longitudinal axis 212. A hole axis 216, the hole axis 216 aligned with the hole 208 can be non-perpendicular to the longitudinal axis 212. The flattened portion 196 can have a flat surface, the longitudinal axis 212 can be non-parallel to the flat surface of the flattened portion 196. The flat surface of the flattened portion 196 can be perpendicular to the hole axis 216. The flattened portion can have a width 198. The width 198 of the flattened portion can be less than the diameter of the core 136. A contact surface 220 can be disposed circumferentially around the hole 208. The contact surface 220 can extend to both sides of the flattened portion 196. The grip portion 200 may extend only partially around the circumference of the angled connection portion 192. In some embodiments, the flattened portion can include 2 or more holes, the various holes can be different sizes and have various arrangements.

FIGS. 6A-6B depict an alternate embodiment of a connection portion receiver 224. The receiver 224 can be sized and shaped to receive the connectors 120, or 152 and provide complete electromagnetic shielding and/or sealing of the busbar end connection. In the depicted embodiment, the receiver 224 is sized and shaped to receive a flat-type connection portion 160. The receiver 224 can have two apertures 228. The apertures 228 can each receiver a connection portion 160. The connection portion 160 can be fastened into place with fasteners 232. The fasteners 232 can engage with the primary holes 172. The fasteners 232 can extend partially into one of two openings 236. The opening 236 can be aligned with the primary hole 172. The receiver 224 can have deep enough apertures for the conductive core 136 to be at least partially (e.g., fully) enclosed. In some embodiments, the opening 236 can be an inlet for electrically conductive gel or grease to be applied to the conducting surface.

FIG. 6C depicts a bracket 240. The bracket 240 can be sized and shaped to receive the connectors 120 or 152. In the depicted embodiment, the bracket 240 is sized and shaped to retain the angled connection portion 192. The bracket 240 can have cups 244 for coupling with the connection portion 192. The bracket 240 can be composed of two parts which are connected together by the clips 244 to retain the connection portion 192. The bracket 240 can at least partially (e.g., completely) cover the conductive core 136.

Figure 7C:
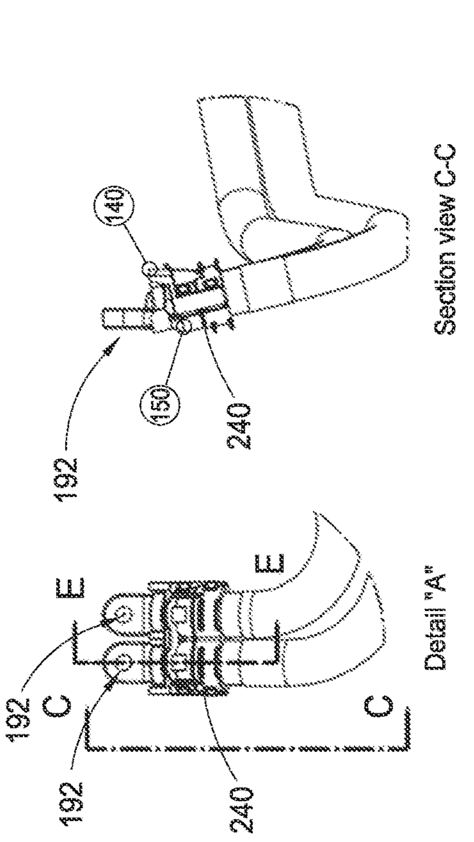
Figure 7D:
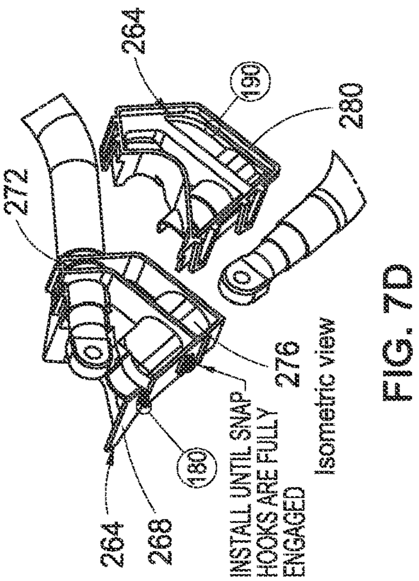
Figure 7A:
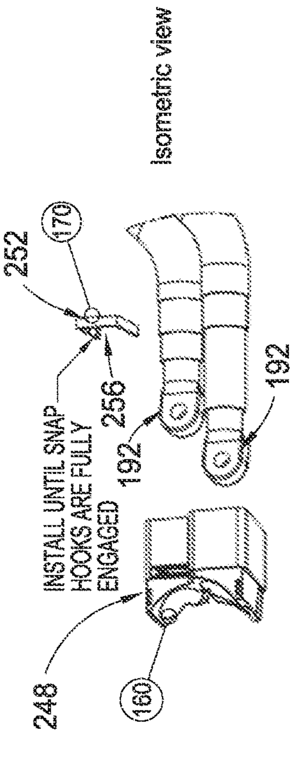

FIG. 7A depicts another embodiment of a bracket 248. The bracket 248 can be sized and shaped to receive the connectors 120 or 152. In the depicted embodiment, the bracket 248 is sized and shaped to retain the angled connection portion 192. A clip 252 can hold the connection portion 192 in place. The clip 252 can have a width 256. The width 256 can be less than the width 198 of the flattened portion 196.

Figure 7B:
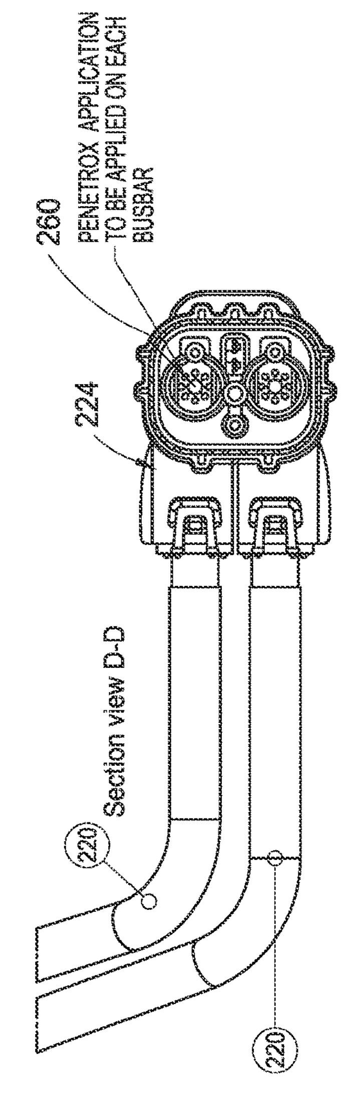

FIG. 7B depicts a top view of the receiver 224 with a cover 260 installed. In some embodiments, an oxide inhibiting electrical joint compound can be applied inside the opening 236.

FIG. 7C depicts a side view of the bracket 240 with the angled connection portion 192 installed.

FIG. 7D depicts another embodiment of a bracket 264. The bracket 264 can be sized and shaped to receive the connectors 120 or 152. In the depicted embodiment, the bracket 248 is sized and shaped to retain the angled connection portion 192. The bracket 264 can receive two angled connection portions 192. The connection portions 192 can be positioned at an angle to each other when installed in the bracket 264, The bracket 264 can have a base plate 268. The base plate 268 can have holes 272, 276 for receiving the angled connection portions 192. The base plate 268 can connect to a top plate 280. The top plate can lock the connection portions 192 in place relative to the bracket 264.

FIG. 8 depicts the busbars 100, 102 connection at the ends to connection portions 120, 152. FIG. 8 further depicts the attachment of a harness or conductive member 284 to the busbars for the purpose of carrying a lower power from a source to a load. The flexible harness member 284 can be similar in various aspects to the busbars 100, 102 in conducting current from a source to a load. The harness member 284 can have mounts 288, 292. The mounts 288, 292 can be suitable for supporting the weight of the member 284 and conforming to vehicle packaging. The ground mounts 288, 292 can be similar to connection portions 120, 152 in many aspects.

FIG. 9 shows an embodiment of a semi-truck 900 having a set of busbars 905 distributed through the interior of a battery storage container 908. As indicated the busbars 905 are configured to conform to the dimensions of the battery storage container 908 and have end terminals 910A-E which may connect to one or more battery connectors (not shown) within the semi-truck 900. A charging port 920 may be used to connect an external charging cable to the busbars 905 to communicate power to the battery connectors within the battery storage container 908.

Example Implementations

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: An electric vehicle power distribution system with a plurality of rigid conductors having an insulation layer and a shielding layer used to carry electrical current from source to load.

Example Two: The system of Example One, wherein the plurality of rigid conductors are used for power distribution which experience high voltage and high current.

Example Three: The system of Example One, wherein the plurality of rigid conductors comprise a conductive material, wherein the conductive material is at least one of aluminum or copper.

Example Four: The system of Example One, wherein the plurality of rigid conductors have two ends, wherein the two ends formed to create an electrical connecting interface by at least one of bolting or welding.

Example Five: The system of Example One, wherein the plurality of rigid conductors have two ends, wherein the two end have an interface that is coupled to the plurality of rigid conductors by at least one of welding or crimping.

Example Six: The system of Example One, wherein the plurality of rigid conductors are insulated by a layer of electrically insulating material, wherein the electrically insulating material is at least one of XLPE, PVC or Silicone.

Example Seven: The system of Example One, wherein the insulation layer is coupled to the conductor through an assembly process, wherein the assembly process is at least one of extrusion, mechanical, or heat shrink.

Example Eight: The system of Example One, wherein the shielding layer is comprised of a conductive material, wherein the conductive material is at least one of aluminum or copper.

Example Nine: The system of Example Eight, wherein the shielding layer is coupled to the insulation layer to provide EMI shielding, mechanical protection and 3D form bending support.

Example Ten: The system of Example One, wherein a shielded high power bulbar assembly undergoes a bending operation to conform to in-vehicle packaging.

As noted above, implementations of the described examples provided above may include hardware, a method or process, and/or computer software on a computer-accessible medium.

Additional Implementation Considerations

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "I".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. An electric vehicle power distribution system comprising:

a unitary busbar comprising a solid core conductor, an insulation layer surrounding the solid core conductor, a shielding layer compressed against the insulation layer, and at least one formed connector made from the solid core conductor, wherein the shielding layer comprises a metal shield tube directly surrounding and radially compressed against the insulation layer such that the solid core conductor, the insulation layer, and the metal shield tube form a unitary three-layer solid core busbar, and wherein the shielding layer is a conductive material formed from a single formed component;

a first connection point configured to electrically connect with the at least one formed connector on the busbar; and a second connection point electrically coupled to the busbar at an end opposite to the at least one formed connector, wherein the unitary busbar is bent to conform to the interior configuration of the electric vehicle; and a rigid ground conductor connected to the shielding layer, wherein the shielding layer is grounded to the electric vehicle via the rigid ground conductor.

2. The electric vehicle power distribution system of claim 1, wherein the first connection point is an electric vehicle charge port.

3. The electric vehicle power distribution system of claim 1, wherein the second connection point is a battery connector in an electric vehicle.

4. The electric vehicle power distribution system of claim 1, wherein the formed connector is forged from the solid core conductor.

5. The electric vehicle power distribution system of claim 4, wherein the formed connector comprises a flattened portion and a through hole disposed through the flattened portion.

6. The electric vehicle power distribution system of claim 1, wherein the busbar can support charging of 350 kW at 400V while maintaining a shielding layer temperature of 100 degrees Celsius or less.

7. The electric vehicle power distribution system of claim 1, wherein the solid core conductor is an aluminum or copper conductor.

8. The electric vehicle power distribution system of claim 1, wherein the shielding layer comprises an aluminum or copper shielding layer.

9. The electric vehicle power distribution system of claim 1, wherein the insulation layer comprises cross-linked polyethylene (XLPE), polyvinyl chloride (PVC) or silicone.

10. The electric vehicle power distribution system of claim 1, wherein the busbar can support charging at 350 kW.

11. The electric vehicle power distribution system of claim 10, wherein the busbar can support charging at 400V.

12. The electric vehicle power distribution system of claim 1, wherein the surface area of a cross-section of the conductor is between 150 to 250 $mm^2$.

13. The electric vehicle power distribution system of claim 1, wherein the thickness of the insulation layer is between .5 to 2 mm.

14. The electric vehicle power distribution system of claim 1, wherein the thickness of the shielding layer is between .5 to 2 mm.

15. The electric vehicle power distribution system of claim 1, wherein the busbar comprises two formed connectors, with one formed connector forged at each end of the solid core conductor.

16. The electric vehicle power distribution system of claim 15, wherein the two formed connectors each comprise a through hole.

* * * * *